US012754201B2

(12) United States Patent
Nikic et al.

(10) Patent No.: US 12,754,201 B2
(45) Date of Patent: Oct. 6, 2026

(54) SYSTEMS AND METHODS FOR ESTIMATING A SPEED OF A VEHICLE

(71) Applicant: THE BOEING COMPANY, Arlington, VA (US)

(72) Inventors: Dejan Nikic, Seattle, WA (US); Mark Donohue Severson, Coupeville, WA (US); Michelle Lu Galgana, Burien, WA (US)

(73) Assignee: THE BOEING COMPANY, Arlington, VA (US)

( * ) Notice: Subject to any disclaimer, the term of this patent is extended or adjusted under 35 U.S.C. 154(b) by 168 days.

(21) Appl. No.: 18/792,050

(22) Filed: Aug. 1, 2024

(65) Prior Publication Data

US 2026/0036604 A1 Feb. 5, 2026

(51) Int. Cl.

| | |
|---|---|
| ***G01P 5/18*** | (2006.01) |
| ***B64D 43/02*** | (2006.01) |
| ***G01P 5/00*** | (2006.01) |
| ***G01P 5/08*** | (2006.01) |
| ***G01P 5/20*** | (2006.01) |

(52) U.S. Cl.

CPC .............. *G01P 5/008* (2013.01); *B64D 43/02* (2013.01); *G01P 5/20* (2013.01)

(58) Field of Classification Search

CPC ............ G01P 5/008; G01P 5/20; B64D 43/02

See application file for complete search history.

(56) References Cited

U.S. PATENT DOCUMENTS

| | | | | |
|---|---|---|---|---|
| 3,757,808 A * | 9/1973 | Peterson | .............. | G05D 7/0635 73/861.02 |
| 6,134,485 A | 10/2000 | Tanielian et al. | | |
| 6,928,341 B2 | 8/2005 | Wise | | |
| 8,256,284 B2 | 9/2012 | Vozhdaev et al. | | |

(Continued)

FOREIGN PATENT DOCUMENTS

| | | |
|---|---|---|
| DE | 102017009995 A1 | 5/2019 |
| GB | 665298 A | 1/1952 |
| GB | 1591216 A | 6/1981 |

OTHER PUBLICATIONS

Asano, K. et al., "Ion-Flow Anemometer Using A High-Voltage Pulse," Journal of Electrostatics, Elsevier Science Publishers B.V. Amsterdam, NL vol. 31, No. Jan. 1, 2994, pp. 91-107.

(Continued)

*Primary Examiner* — Mussa A Shaawat
(74) *Attorney, Agent, or Firm* — Moore IP Law

(57) ABSTRACT

A sensor includes an emitter electrode configured to be disposed at a first position and exposed to a fluid airflow. The emitter electrode is configured to generate charged particles proximate the emitter electrode via a voltage pulse. The sensor includes a collector electrode configured to be disposed at a second position and exposed to the fluid airflow. The second position is aft of the first position. The collector electrode is configured to detect a current associated with a flow of the charged particles during relative movement of the fluid airflow. The sensor includes one or more processors coupled to the emitter electrode and the collector electrode, wherein the one or more processors are configured to measure a duration between the voltage pulse and the current, and wherein the duration is indicative of a speed of a vehicle.

20 Claims, 7 Drawing Sheets

(56) References Cited

U.S. PATENT DOCUMENTS

| | | | | |
|---|---|---|---|---|
| 9,038,453 | B2 | 5/2015 | Paris | |
| 9,702,892 | B1 * | 7/2017 | Richardson | G01P 13/025 |
| 9,758,257 | B1 * | 9/2017 | Frolov | G01C 21/20 |
| 10,222,452 | B2 * | 3/2019 | Bisti | G08G 5/26 |
| 11,150,262 | B1 * | 10/2021 | Sundelin | G01P 5/12 |
| 11,828,771 | B2 * | 11/2023 | Tillotson | G01S 17/95 |
| 2001/0054311 | A1 * | 12/2001 | Hakenesch | G01M 9/062 73/170.02 |
| 2009/0044634 | A1 * | 2/2009 | Weilguny | G01P 13/02 73/1.16 |
| 2009/0306839 | A1 * | 12/2009 | Youngquist | G01K 7/021 73/114.26 |
| 2011/0219869 | A1 * | 9/2011 | Asahara | G01S 17/95 73/181 |
| 2015/0344137 | A1 * | 12/2015 | Bartz | G01P 13/025 219/494 |
| 2016/0062363 | A1 * | 3/2016 | Fengler | G05D 1/0055 701/8 |
| 2017/0267371 | A1 * | 9/2017 | Frolov | G01F 1/32 |
| 2021/0018529 | A1 * | 1/2021 | Tillotson | G01C 23/00 |
| 2021/0147096 | A1 | 5/2021 | Tillotson | |
| 2022/0219833 | A1 * | 7/2022 | Severson | G01P 13/025 |
| 2024/0001375 | A1 * | 1/2024 | Henley | B03C 3/32 |
| 2024/0068454 | A1 * | 2/2024 | Leta | B64D 27/353 |
| 2025/0361023 | A1 | 11/2025 | Severson et al. | |

OTHER PUBLICATIONS

Extended European Search Report for application No. 25169371.9 dated Oct. 1, 2025, pp. 1-9.

Extended European Search Report for application No. 25185789.2 dated Dec. 19, 2025, pp. 1-10.

Krylov D. L. et al., “Analysis of Errors for Measuring Channels of Aircraft Air Data System with a Fixed Non-Protruding Flow Receiver,” Russian Aeronautics (IZ VUZ) Apr. 18, 2018, pp. 481-487.

* cited by examiner

SYSTEMS AND METHODS FOR ESTIMATING A SPEED OF A VEHICLE

FIELD OF THE DISCLOSURE

The subject disclosure is generally related to systems and methods for estimating a speed of a vehicle.

BACKGROUND

With ever-increasing air traffic, safety and reliability of aircraft operation becomes correspondingly important. One way aircraft operators ensure safe, reliable operations is through various types of sensors on the aircraft. For example, a speed sensor can provide information about the speed at which an aircraft is traveling. A speed sensor can be configured to measure a speed of the aircraft relative to a reference frame (e.g., the ground), a speed of the air through which the aircraft is traveling relative to the aircraft itself, or some combination thereof. This data is used for the proper functioning of flight control systems, especially during critical phases of flight such as takeoff, landing, and maneuvers.

Aircraft sensors should be accurate, and redundant sources of accurate information should be available to aircrew. For example, inaccurate ground speed or airspeed readings can lead to confusion for flight crews and potentially dangerous flight situations. Redundant sensors act as a fail-safe mechanism, allowing flight crews to cross-check data from multiple sources and identify discrepancies or failures quickly. This redundancy enhances the overall reliability of the aircraft's systems and increases safety margins, particularly in scenarios where accurate aircraft speed information is used to facilitate stable flight.

Furthermore, redundant sensors contribute to the resilience of an aircraft in the face of various environmental factors. Adverse weather conditions, such as icing or turbulence, can affect the performance of sensors, leading to unreliable readings. Having multiple sensors installed ensures that the aircraft can maintain accurate flight data even in challenging conditions. Accordingly, it can be important for redundant sensors to operate in different operating conditions for the aircraft.

SUMMARY

In a particular implementation, an aircraft includes an exterior skin. The aircraft also includes an emitter electrode disposed at a first position in proximity to the exterior skin and exposed to ambient air. The emitter electrode is configured to generate charged particles proximate the emitter electrode via a voltage pulse. The aircraft also includes a collector electrode disposed at a second position in proximity to the exterior skin and exposed to ambient air. The second position is aft of the first position. The collector electrode is configured to detect a current associated with a flow of the charged particles during movement of the aircraft through an atmosphere. The aircraft also includes one or more processors coupled to the emitter electrode and the collector electrode. The one or more processors are configured to measure a duration between the voltage pulse and the current, and wherein the duration is indicative of a speed of the aircraft.

In another particular implementation, a sensor includes an emitter electrode disposed at a first position and exposed to a fluid airflow. The emitter electrode is configured to generate charged particles proximate the emitter electrode via a voltage pulse. The sensor also includes a collector electrode disposed at a second position and exposed to the fluid airflow. The second position is aft of the first position. The collector electrode is configured to detect a current associated with a flow of the charged particles during relative movement of the fluid airflow. The sensor also includes one or more processors coupled to the emitter electrode and the collector electrode. The one or more processors are configured to measure a duration between the voltage pulse and the current, and wherein the duration is indicative of a speed of a vehicle.

In another particular implementation, a method includes emitting charged particles via a voltage pulse at an emitter electrode disposed at a first position and exposed to ambient air. The method also includes detecting a current at a collector electrode based on a flow of the charged particles. A duration between the voltage pulse and the current is indicative of a speed of an airflow. The collector electrode is disposed at a second position and exposed to ambient air. The second position is behind the first position relative to the airflow.

DETAILED DESCRIPTION

The systems and methods disclosed herein enable detection of a speed of a vehicle by providing a sensor that can be implemented as a solid-state, non-mechanical sensor with no moving parts that can be incorporated into a vehicle flush with a surface (e.g., the vehicle skin) to improve sensor reliability and maintainability. The systems and methods disclosed herein emit charged particles (e.g., ions) exposed to ambient air and detect currents at a one or more collector electrodes based on a flow of the charged particles, where the currents are indicative of a speed of the vehicle.

A technical advantage of the subject disclosure is the enablement of efficient and reliable sensor operation. For example, a speed sensor implemented using the systems and methods disclosed herein can substantially eliminate known vulnerabilities of certain other types of speed sensors such as damage and failures due to ground incursions, bird strikes, ice, improper maintenance, etc.

Another technical advantage of the subject disclosure is the enablement of using charged airflow to provide multiple types of air data such as angle of attack, airspeed, static pressure, total air temperature, etc.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
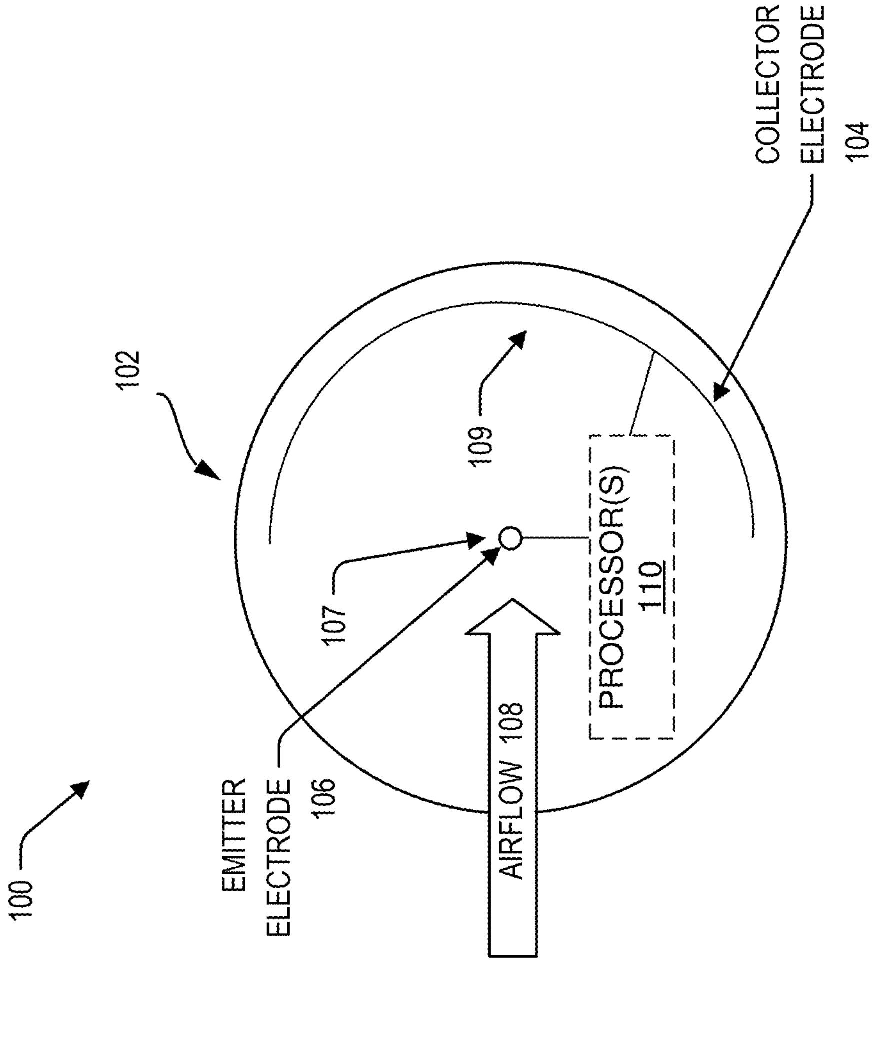
FIG. 1 depicts an example system for estimating a speed of a vehicle, in accordance with some examples of the subject disclosure.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a sensor 102 including one or more processors ("processor(s)" 110 in FIG. 1), which indicates that in some implementations the sensor 102 includes a single processor 110 and in other implementations the sensor 102 includes multiple processors 110. For ease of reference herein, such features are generally introduced as "one or more" features and are subsequently referred to in the singular or optional plural (as indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example system 100 for estimating a speed of a vehicle, in accordance with some examples of the subject disclosure. In some implementations, the system 100 includes a sensor 102 that includes an emitter electrode 106 and a collector electrode 104.

In some implementations, the sensor(s) 102 can include, correspond to, or be included within one or more vehicles (e.g., aircraft, unmanned aerial vehicle, etc.), as described below with reference to FIG. 2. In the same or alternative implementations, the sensor(s) 102 can include, correspond to, or be included within one or more other surfaces (e.g., an aircraft model for use in a wind tunnel, a test surface, etc.). In the same or alternative implementations, the sensor is a solid-state speed sensor that includes the emitter electrode 106, the collector electrode 104, and a direct-current, high-voltage power source, as described below with reference to FIG. 5.

In some implementations, the emitter electrode 106 is configured to provide an electrical potential between the emitter electrode 106 and the collector electrode 104. The emitter electrode 106 is configured to generate charged particles proximate the emitter electrode 106. For example, the emitter electrode 106 can be configured to generate charged particles with a positive charge to create a plasma cloud around the emitter electrode 106. In some aspects, the emitter electrode 106 is configured to generate charged particles proximate the emitter electrode via a voltage pulse. The voltage pulse used to generate the charged pulse is of a relatively high voltage. For example, the voltage pulse can include a pulse with a voltage magnitude greater than five kilovolts and a duration of less than one microsecond. In a particular example, the voltage pulse can have a duration of approximately fifty nanoseconds. In a particular aspect, the pulse duration is of a sufficient length to generate a detectable current at the sensor 102 given an operational context of the vehicle (e.g., a speed, altitude, etc. of the vehicle) and short enough to allow multiple current readings during a period of interest (e.g., multiple readings per minute). A pulse duration of approximately fifty nanoseconds allows for multiple readings at a speed of approximately 343 m/s with a speed estimate error rate of approximately 1.5%.

In some implementations, the emitter electrode 106 is disposed at a first position 107 and exposed to a fluid airflow 108. In some aspects, the first position 107 is a position extending above a boundary layer associated with the relative movement of the fluid airflow 108, as described in more detail below with reference to FIG. 3. In the same or alternative aspects, the emitter electrode 106 is shaped to define an apex to concentrate electrical field ionization. For example, the emitter electrode 106 can have a substantially conical shape. In further same or alternative aspects, at least one collector electrode 104 has a blunted shape. The blunted shape can be configured to increase surface area of the portion of the collector electrode 104 configured to receive charged particles.

In some implementations, the collector electrode 104 are configured to be disposed at a second position 109 and exposed to the fluid airflow 108. The second position 109 can be offset from the first position 107. For example, if the sensor 102 is mounted on an aircraft, the second position 109 can be aft of the first position 107. In some aspects, the second position 109 is sufficiently spaced relative to the first position 107 to substantially prevent arcing between the emitter electrode 106 and the collector electrode 104, as described in more detail below with reference to FIG. 3.

In some implementations, the collector electrode 104 is configured to detect a current associated with a flow of the charged particles during relative movement of the fluid airflow 108. For example, if the emitter electrode 106 generates positively charged particles around the emitter electrode 106, relative movement of the fluid airflow 108 will cause a corresponding movement of the charged particles toward the collector electrode 104. The collector electrode 104 can be configured to detect a current associated with a flow of the charged particles received at the respective collector electrode 104. In some aspects, the collector electrode 104 is a substantially arced shape with a focus located at or near the first position 107. In the same or alternative aspects, the collector electrode 104 can be a single-point collector electrode located at the second position 109. In further the same or alternative aspects, the collector electrode 104 can include an array of collector electrodes arranged angularly around a first collector electrode at a reference position.

In some implementations, the sensor(s) 102 can also include one or more processors 110 coupled to the emitter electrode 106 and the collector electrode 104. In some aspects, the processor(s) 110 can be integrated into the sensor(s) 102. In the same or alternative aspects, the processor(s) 110 can be separate from a solid-state sensor 102 and coupled to the emitter electrode 106 and the collector electrode 104. The processor(s) 110 are configured to measure a duration between the voltage pulse and the current. The duration is indicative of a speed of the vehicle.

In some aspects, the system 100 can also include a charge measuring circuit coupled to the collector electrode 104 and the processor(s) 110. The charge measuring circuit can be configured to measure the current at the collector electrode 104. For example, the charge measuring circuit can be configured to sample the current at a sampling rate of greater than or equal to ten megahertz. The sampling rate can be selected based on the frequency and width of the voltage pulse at the emitter electrode 106. The sampling rate allows the charge measuring circuit to respond quickly enough to received charge with a speed estimate resolution high enough to be within an acceptable error rate. For example, a ten megahertz sampling rate measuring a fifty nanosecond high-voltage pulse at a speed of approximately 343 m/s and spacing between the emitter electrode 106 and the collector electrode 104 allows for a speed estimate error of approximately 1.5%.

As an illustrative operation, the relative movement of the fluid airflow 108 can include operation of the sensor 102 in an atmosphere. For example, the sensor 102 can be coupled to a skin of an aircraft moving through the atmosphere. The emitter electrode 106 can be configured to generate a plasma of positively charged particles via a voltage pulse, which are moved by the relative motion of the fluid airflow 108 toward the collector electrode 104. As the charged particles are received at the collector electrode 104, a current sensor and/or charge measuring circuit coupled to each of the collector electrode 104 can detect and/or measure the current induced at each collector electrode 104 and output a plurality of sensor signals. The processor(s) 110 can receive the sensor signals and measure a duration between the voltage pulse and the current, where the duration is indicative of a speed of a vehicle through the atmosphere. For example, if the emitter electrode 106 generates the voltage pulse at $T_0$, and the collector electrode 104 detect a current associated with the flow of charge particles generated by the voltage pulse at $T_1$, the duration D can be measured by: $D=T_1-T_0$. When the distance L between the emitter electrode 106 and the collector electrode 104 is known, the speed V of the charged particles between the emitter electrode 106 and the collector electrode 104 can be calculated by: $V=L/D$. The speed V is indicative of the speed of the vehicle relative to the airflow 108.

In a particular aspect, the collector electrode 104 are part of an array of collector electrodes configured to be disposed at the second position 109 and exposed to the fluid airflow 108. The array of collector electrodes can include a first set of collector electrodes angularly offset from the collector electrode 104 in a first direction and a second set of collector electrodes angularly offset from the collector electrode 104 in a second direction. Outputs from the array of collector electrodes are indicative of an angular direction of the relative movement of the fluid airflow 108.

In a particular configuration, the collector electrode 104 is aligned with the emitter electrode 106 at a reference position. The sensor 102 can be implemented to return angle of attack measurements in a range of interest (e.g., ±60 degrees) relative to the reference position. The sensor 102 can also include an array of current sensors, each sensor of the array of current sensors coupled to a respective collector electrode of the array of collector electrodes. Each sensor of the array of current sensors can also be configured to output a sensor signal. The processor(s) 110 can be configured to receive the sensor signals from the array of current sensors and configured to compute an angular direction parameter value based, at least in part, on a relationship between respective magnitudes of the currents associated with the sensor signals. The direction of the relative movement of the fluid airflow 108 is indicated by the angular direction parameter value.

In a particular example, the sensor 102 can be configured to generate charged particles, which, when received by the array of collector electrodes, can be used to generate current indicative of a speed of the vehicle and current indicative of an angular direction of the relative movement of the fluid airflow 108. The emitter electrode 106 can be configured to generate charged particles proximate the emitter electrode 106 via a first voltage pulse of a first duration, and to generate charged particles proximate the emitter electrode 106 via a second voltage pulse of a second duration. The second duration can be longer than the first duration. The first voltage pulse can be associated with the output of the collector electrode 104 indicative of the speed of the vehicle relative to the fluid airflow 108, and the second voltage pulse can be associated with the output of the collector electrode 104 indicative of the angular direction of the relative movement of the fluid airflow 108.

In a particular configuration, movement of the aircraft through the atmosphere includes a lateral axis motion of the aircraft and a chord line of an airfoil relative to airflow as the airfoil moves through the atmosphere. The lateral movement causes a change of the angle of attack of the aircraft. In such a configuration, the reference position includes a zero-angle reference position, the first direction includes a positive angle direction, and the second direction includes a negative angle direction.

Figure 2:
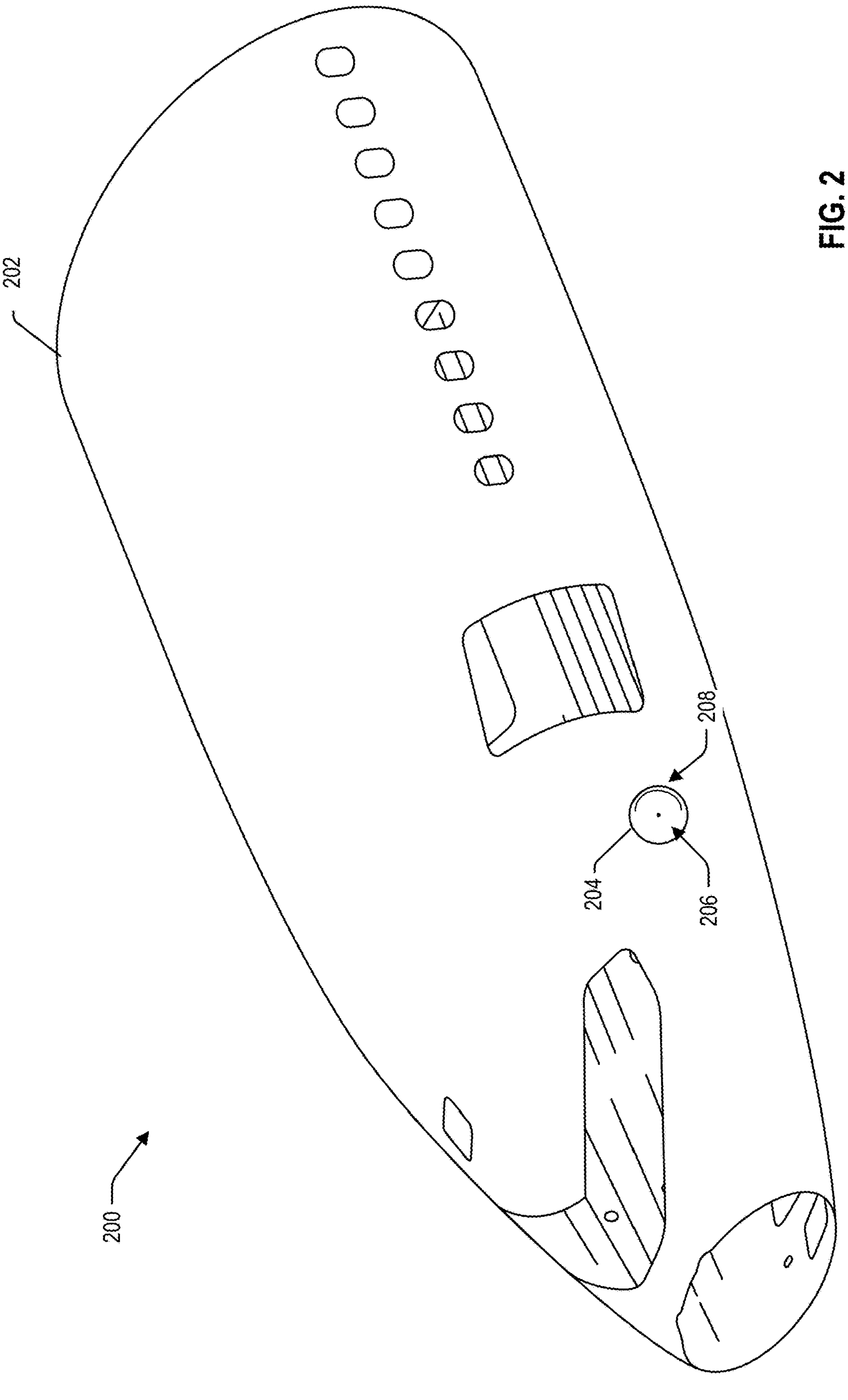
FIG. 2 depicts an example of a portion of an aircraft including a sensor detecting a speed of the aircraft, in accordance with some examples of the subject disclosure.

FIG. 2 depicts an example of a portion of an aircraft 200 that includes a sensor for detecting a speed of the aircraft relative to an airflow, in accordance with some examples of the subject disclosure. Optionally, the sensor may also be configured to detect an angle of the airflow relative to the aircraft. In some implementations, the aircraft 200 includes an exterior skin 202 and a sensor 204 coupled to the exterior skin 202. Generally, the sensor 204 corresponds to the sensor 102 of FIG. 1.

In some implementations, the sensor 204 includes an emitter electrode (e.g., the emitter electrode 106 of FIG. 1) disposed at a first position 206 in proximity to the exterior skin 202 and exposed to ambient air. In a particular aspect, the first position 206 is elevated from the exterior skin 202 and extends above a boundary layer associated with the ambient air during movement of the aircraft 200 through the atmosphere. The emitter electrode is configured to generate charged particles proximate the emitter electrode, as described in more detail above with reference to FIG. 1.

The sensor 204 can also include one or more collector electrodes (e.g., the collector electrode 104 of FIG. 1) disposed at a second position 208 in proximity to the exterior skin 202 and exposed to ambient air. The second position 208 can be aft of the first position 206. In some aspects, the second position 208 is sufficiently spaced relative to the first position 206 to substantially prevent arcing between the emitter electrode 106 and the array of collector electrodes 104, as described in more detail below with reference to FIG. 3.

In some implementations, data from the sensor 204 can be provided to a component of a vehicle to inform vehicle operators of operating conditions associated with the vehicle based on data from the sensor 204. For example, airspeed, angle of attack, or both can be provided to a flight deck display of the aircraft 200 to inform flight crew of the speed, angle of attack, or both; provided to a flight computer of the aircraft 200 to determine flight conditions and/or to generate control signals for the aircraft 200; provided to measurement and/or test circuitry to monitor performance of a test vehicle, etc.

Although FIG. 2 illustrates certain features of the aircraft 200, more, fewer, and/or different components of the aircraft 200 can be present without departing from the scope of the subject disclosure. For example, the aircraft 200 can include an array of current sensors. Each sensor of the array of current sensors is coupled to a respective collector electrode of the array of collector electrodes and configured to output a sensor signal. The aircraft 200 can also include one or more processors connected to receive the sensor signals from the array of current sensors.

Figure 3:
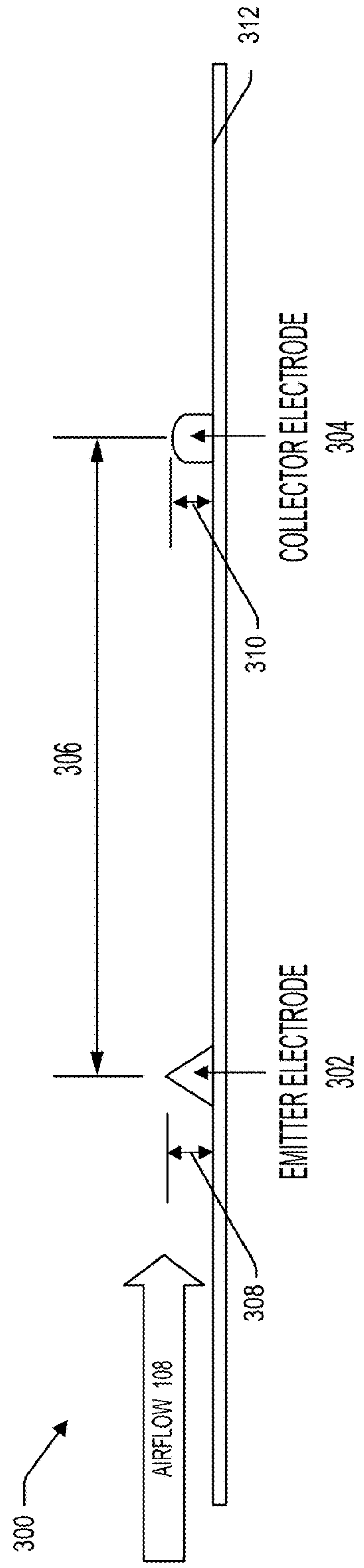
FIG. 3 illustrates an exemplary system including an emitter electrode relative to a collector electrode, in accordance with some examples of the subject disclosure.

FIG. 3 illustrates an exemplary system 300 including an emitter electrode 302 relative to a collector electrode 304, in accordance with some examples of the subject disclosure. Generally, the emitter electrode 302 corresponds to the emitter electrode 106 of FIG. 1 and the collector electrode 304 corresponds to the collector electrode 104 of FIG. 1.

In some implementations, the emitter electrode 302 is disposed at a first position (e.g., the first position 107 of FIG. 1, the first position 206 of FIG. 2, etc.) and the collector electrode 304 is disposed at a second position (e.g., the second position 109 of FIG. 1, the second position 208 of FIG. 2, etc.). Both the emitter electrode 302 and the collector electrode 304 are exposed to the fluid airflow 108 of FIG. 1. For example, the emitter electrode 302 and the collector electrode 304 can be disposed in proximity to the exterior skin of an aircraft and exposed to ambient air, as described above with reference to FIG. 2. In such a configuration, the second position is aft of the first position.

In some aspects, the second position of the collector electrode 304 is sufficiently spaced relative to the first position of the emitter electrode 302 to substantially prevent arcing between the emitter electrode 302 and the collector electrode 304. For example, the distance 306 between the emitter electrode 302 and the collector electrode 304 can be approximately five centimeters. In the same or alternative aspects, the first position, the second position, or both, extends above a boundary layer associated with the relative movement of the fluid airflow 108. For example, the distance 308 between the emitter electrode 302 and the surface 312 on which the emitter electrode 302 is disposed can be approximately 2.54 mm. The distance between the respective electrodes and the surface 312 can be the same or different for the emitter electrode 302 and the collector electrode 304. For example, the distance 310 between the collector electrode 304 and the surface 312 on which the collector electrode 304 is disposed can be approximately 2.0 mm. Additionally, the distance 310 can be the same or different for the plurality of collector electrodes 304 in a particular configuration of the array of collector electrodes 104 of FIG. 1.

In some implementations, the collector electrode 304, the emitter electrode 302, or both can include a plasma-durable material, such as tungsten. In the same or alternative implementations, the collector electrode 304, the emitter electrode 302, or both can include a dielectric material. The dielectric material can include a ceramic material, a plastic material, a fiberglass material, or a combination thereof.

As an illustrative operation, at an approximate speed of 343 m/s, with the distance 306 of approximately five centimeters, a high voltage pulse of less than one microsecond at the emitter electrode 302 should generate a current at the collector electrode 304 after approximately 145 microseconds. This can provide an estimate of the speed of the vehicle relative to the fluid airflow 108, where the estimate has an error rate of approximately 1.5%. The estimate would, generally, be more accurate at lower speeds and less accurate at higher speeds.

Figure 4:
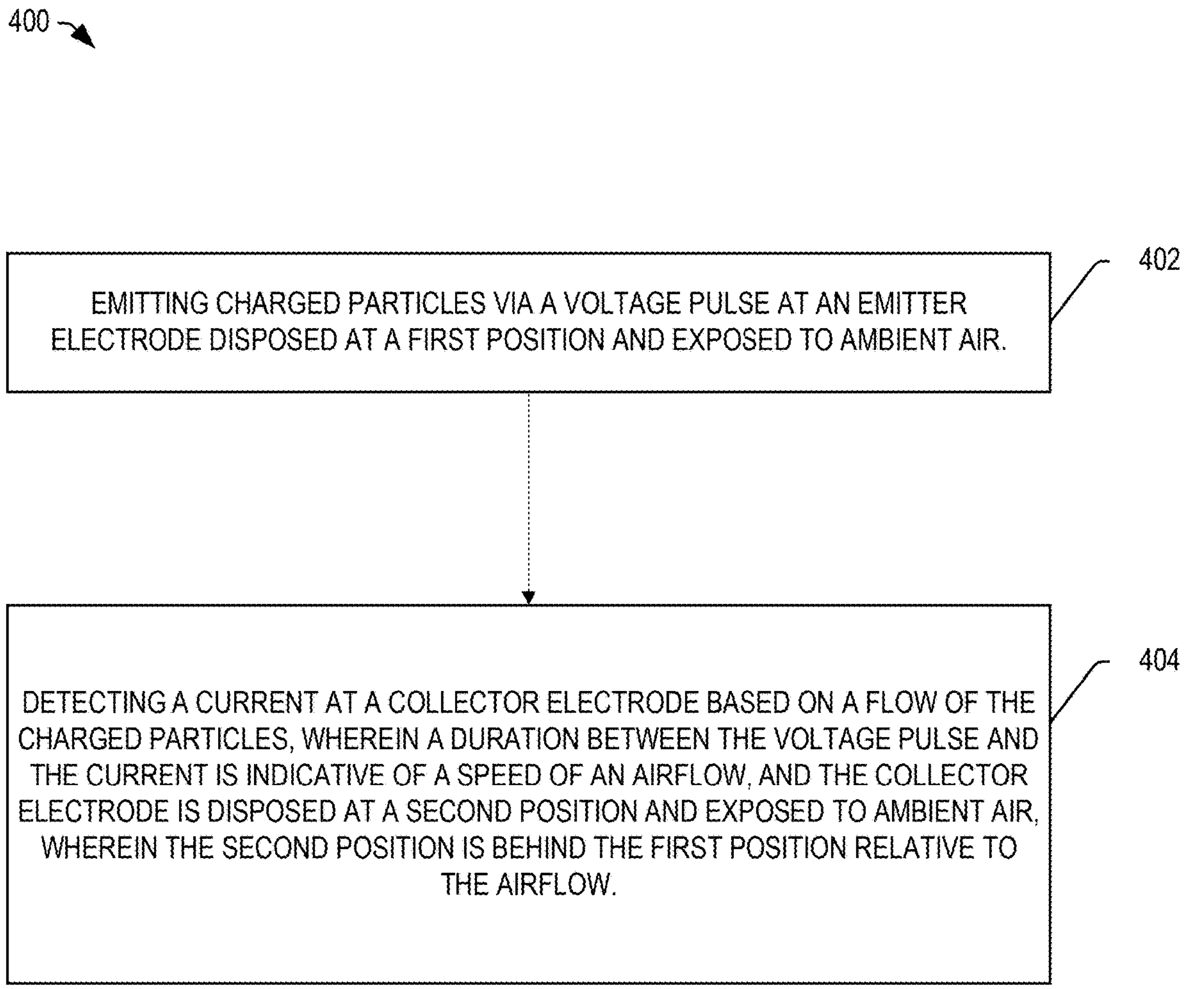
FIG. 4 is a flow chart of an example method for estimating a speed of a vehicle, in accordance with some examples of the subject disclosure.

FIG. 4 is a flow chart of an example method 400 for estimating a speed of a vehicle, in accordance with some examples of the subject disclosure. The method 400 can be initiated, performed, or controlled by one or more processors executing instructions, such as by the processor(s) 520 of FIG. 5 executing instructions 536 from the memory 530. The method 400 can also be initiated, performed, or controlled by the sensor 102 or the processor(s) 110 of FIG. 1, the sensor 204 of FIG. 2, the system 300 of FIG. 3, or some combination thereof.

In some implementations, the method 400 includes, at block 402, emitting charged particles via a voltage pulse at an emitter electrode disposed at a first position and exposed to ambient air. For example, the sensor 102 of FIG. 1 can be configured to emit charged particles at the emitter electrode 106 disposed at the first position 107 and exposed to the fluid airflow 108.

The method 400 includes, at block 404, detecting a current at a collector electrode based on a flow of the charged particles, wherein a duration between the voltage pulse and the current is indicative of a speed of an airflow, and the collector electrode is disposed at a second position and exposed ambient air, wherein the second position is behind the first position relative to the airflow. For example, the sensor 102 of FIG. 1 can be configured to detect a current at the collector electrode 104 based on the flow of the charged particles. A duration between the voltage pulse and the current is indicative of the speed of the fluid airflow 108. The collector electrode 104 are disposed at the second position 109 and exposed to the fluid airflow 108. The second position 109 is behind the first position 107 relative to the fluid airflow 108.

In some implementations, the method 400 can include more, fewer, and/or different steps without departing from the scope of the subject disclosure. For example, the method 400 can also include receiving sensor signals from an array of current sensors coupled to a respective collector electrode of the array of collector electrodes. The method 400 can also include generating an angular direction parameter value based at least in part on a relationship between respective magnitudes of the currents associated with the sensor signals.

As another example, the method 400 can provide data to a component of a vehicle to inform vehicle operators of operating conditions associated with the vehicle based on the data. For example, airspeed, angle of attack, or both can be provided to a flight deck display of an aircraft (e.g., the aircraft 200 of FIG. 2) to inform flight crew of the speed, angle of attack, or both; provided to a flight computer of the aircraft 200 to determine flight conditions and/or to generate control signals for the aircraft 200; provided to measurement and/or test circuitry to monitor performance of a test vehicle, etc.

Further, the methods described above with reference to FIG. 4 can be implemented to realize one or more of the technical advantages described in more detail above. For example, the method 400 can enable a more reliable and maintainable speed sensor.

Figure 5:
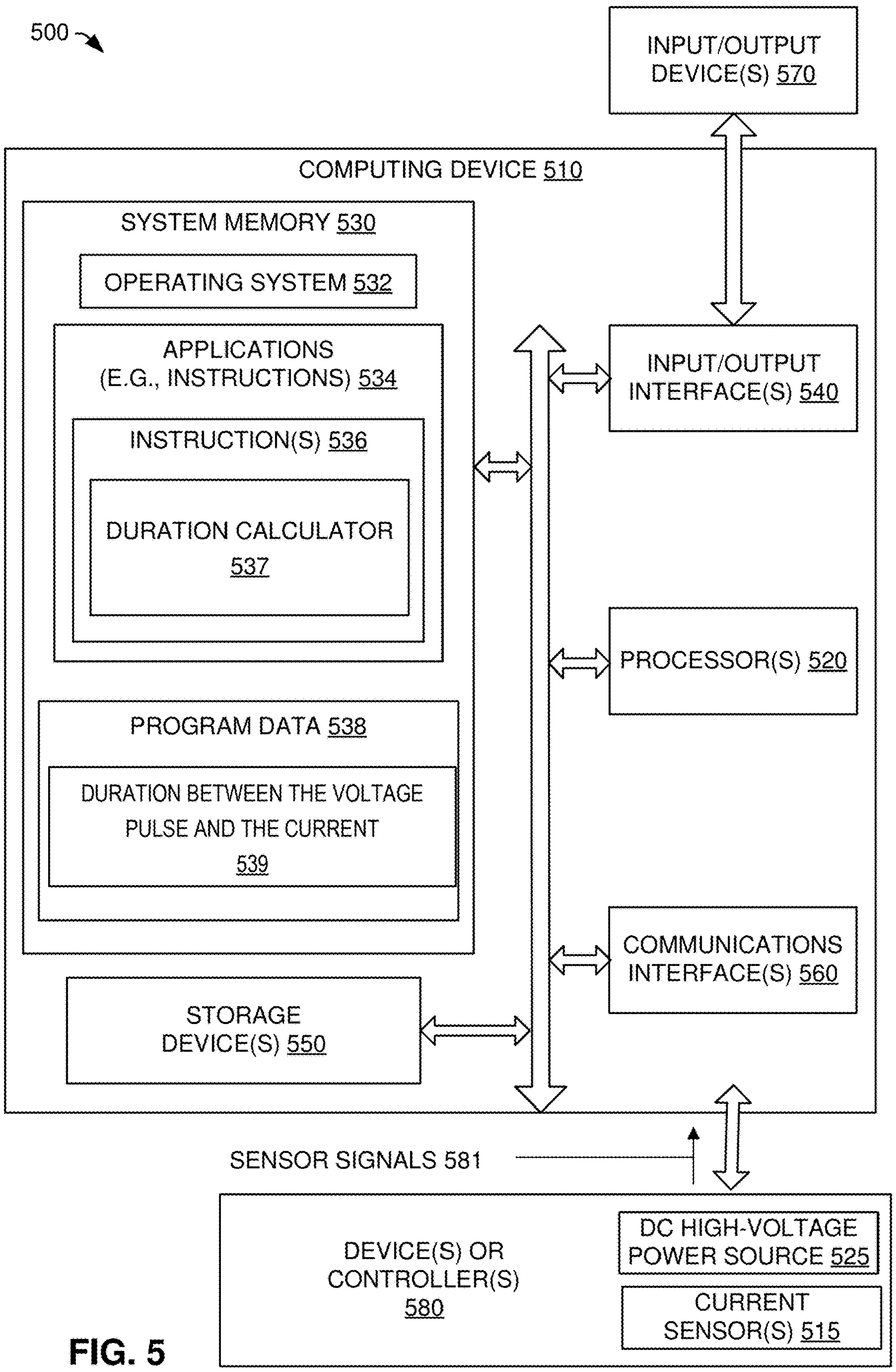
FIG. 5 is a block diagram of a computing environment including a computing device configured to support aspects of computer-implemented methods and computer-executable program instructions (or code), in accordance with some examples of the subject disclosure.

FIG. 5 is a block diagram of a computing environment 500 including a computing device 510 configured to support aspects of computer-implemented methods and computer-executable program instructions (or code), in accordance with some examples of the subject disclosure. For example, the computing device 510, or portions thereof, is configured to execute instructions to initiate, perform, or control one or more operations described in more detail above with reference to FIGS. 1-4. In a particular aspect, the computing device 510 can include, correspond to, or be included within a computing device, one or more servers, one or more virtual devices, or a combination thereof.

The computing device 510 includes one or more processors 520. The processor(s) 520 are configured to communicate with system memory 530, one or more storage devices 550, one or more input/output interfaces 540, one or more communications interfaces 560, or any combination thereof. The system memory 530 includes volatile memory devices (e.g., random access memory (RAM) devices), nonvolatile memory devices (e.g., read-only memory (ROM) devices, programmable read-only memory, and flash memory), or both. The system memory 530 stores an operating system 532, which can include a basic input/output system for booting the computing device 510 as well as a full operating system to enable the computing device 510 to interact with users, other programs, and other devices. The system memory 530 stores system (program) data 538, such as the duration 539 between the voltage pulse and the current from sensor signals 581.

The system memory 530 includes one or more applications 534 (e.g., sets of instructions) executable by the processor(s) 520, such as a duration calculator 537. As an example, the one or more applications 534 include the instructions 536 executable by the processor(s) 520 to initiate, control, or perform one or more operations described with reference to FIGS. 1-4. To illustrate, the one or more applications 534 include the instructions 536 executable by the processor(s) 520 to initiate, control, or perform one or more operations described with reference to measuring the duration between the voltage pulse and the current, where the duration is indicative of a speed of the vehicle. The times associated with the voltage pulse and the current can, in some implementations, be received via the sensor signals 581.

In a particular implementation, the system memory 530 includes a non-transitory, computer-readable medium (e.g., a computer-readable storage device) storing the instructions 536 that, when executed by the processor(s) 520, cause the processor(s) 520 to initiate, perform, or control operations for estimating a speed of a vehicle. The operations include receiving the sensor signals from the array of current sensors (e.g., one or more charge measuring circuits) and computing a duration between the voltage pulse at the emitter electrode and the current incident at the collector electrodes.

In the same or alternative particular implementations, the system memory 530 includes a non-transitory, computer-readable medium (e.g., a computer-readable storage device) storing the instructions 536 that, when executed by the processor(s) 520, cause the processor(s) 520 to initiate, perform, or control operations for detecting an angle of an airflow. The operations include measuring a duration between the voltage pulse and the current, wherein the duration is indicative of a speed of the vehicle.

The one or more storage devices 550 include nonvolatile storage devices, such as magnetic disks, optical disks, or flash memory devices. In a particular example, the storage devices 550 include both removable and non-removable memory devices. The storage devices 550 are configured to store an operating system, images of operating systems, applications (e.g., one or more of the applications 534), and program data (e.g., the program data 538). In a particular aspect, the system memory 530, the storage devices 550, or both, include tangible computer-readable media. In a particular aspect, one or more of the storage devices 550 are external to the computing device 510.

The one or more input/output interfaces 540 enable the computing device 510 to communicate with one or more input/output devices 570 to facilitate user interaction. For example, the one or more input/output interfaces 540 can include a display interface, an input interface, or both. For example, the input/output interface 540 is adapted to receive input from a user, to receive input from another computing device, or a combination thereof. In some implementations, the input/output interface 540 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 570 includes one or more user interface devices and displays, including some combination of buttons, keyboards, pointing devices, displays, speakers, microphones, touch screens, and other devices.

In some implementations, the input/output device(s) 570 include one or more components of a vehicle configured to receive data from a sensor (e.g., the sensor 102 of FIG. 1)

and further apply that data. For example, a flight deck display of an aircraft (e.g., the aircraft 200 of FIG. 2) can be configured to receive airspeed data, angle of attack data, or both and display the data (or a modified version of the data) to inform flight crew of the speed, angle of attack, or both; a flight computer of the aircraft 200 can be configured to determine flight conditions and/or to generate control signals for the aircraft 200; measurement and/or test circuitry can be configured to monitor performance of a test vehicle, etc.

The processor(s) 520 are configured to communicate with devices or controllers 580 via the one or more communications interfaces 560. For example, the one or more communications interfaces 560 can include a network interface. The devices or controllers 580 can include, for example, the sensor(s) 102 of FIG. 1, the sensor 204 of FIG. 2, the system 300 of FIG. 3, or some combination thereof. In some implementations, the devices or controllers 580 can include a direct-current ("DC"), high-voltage power source 525, and array of current sensors 515, or a combination thereof. For example, as described in more detail above with reference to FIG. 1, the sensor 102 configured as a solid-state, speed sensor can include the DC high-voltage power source 525. The DC high-voltage power source 525 can be configured to generate the voltage pulse at the emitter electrode. As another example, the sensor 102 can include one or more current sensors 515, where the current sensor(s) are coupled to a collector electrode 104 of FIG. 1 and configured to output the sensor signals 581.

In some implementations, a non-transitory, computer-readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-4. In some implementations, part or all of one or more of the operations or methods of FIGS. 1-4 can be implemented by one or more processors (e.g., one or more central processing units (CPUs), one or more graphics processing units (GPUs), one or more digital signal processors (DSPs)) executing instructions, by dedicated hardware circuitry, or any combination thereof.

Figure 6:
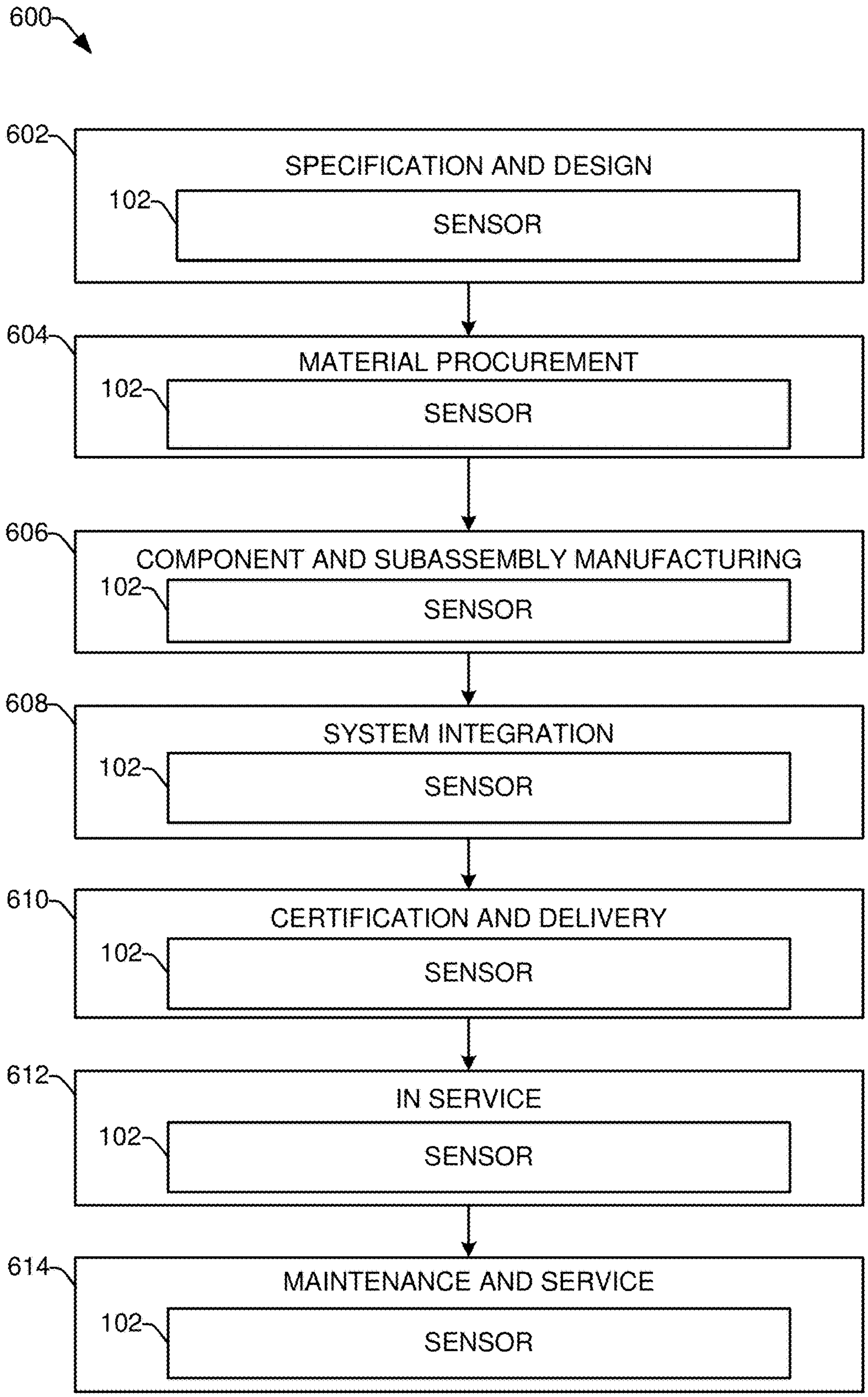
FIG. 6 is a flowchart of an example method illustrating a life cycle of an aircraft that includes a sensor for estimating a speed of a vehicle, in accordance with some examples of the subject disclosure.

FIG. 6 is a flowchart of an example method 600 illustrating a life cycle of an aircraft that includes a sensor for estimating a speed of a vehicle, in accordance with some examples of the subject disclosure. During pre-production, the method 600 includes, at 602, specification and design of an aircraft, such as the portion of the aircraft 200 described with reference to FIG. 2. During specification and design of the aircraft, the method 600 may include specification and design of the sensor 102. At 604, the method 600 includes material procurement, which may include procuring materials for the sensor 102.

During production, the method 600 includes, at 606, component and subassembly manufacturing and, at 608, system integration of the aircraft. For example, the method 600 may include component and subassembly manufacturing of the sensor 102 and system integration of the sensor 102. At 610, the method 600 includes certification and delivery of the aircraft and, at 612, placing the aircraft in service. Certification and delivery may include certification of the sensor 102 to place the sensor 102 in service. While in service by a customer, the aircraft may be scheduled for routine maintenance and service (which may also include modification, reconfiguration, refurbishment, and so on). At 614, the method 600 includes performing maintenance and service on the aircraft, which may include performing maintenance and service on the sensor 102.

Each of the processes of the method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 7:
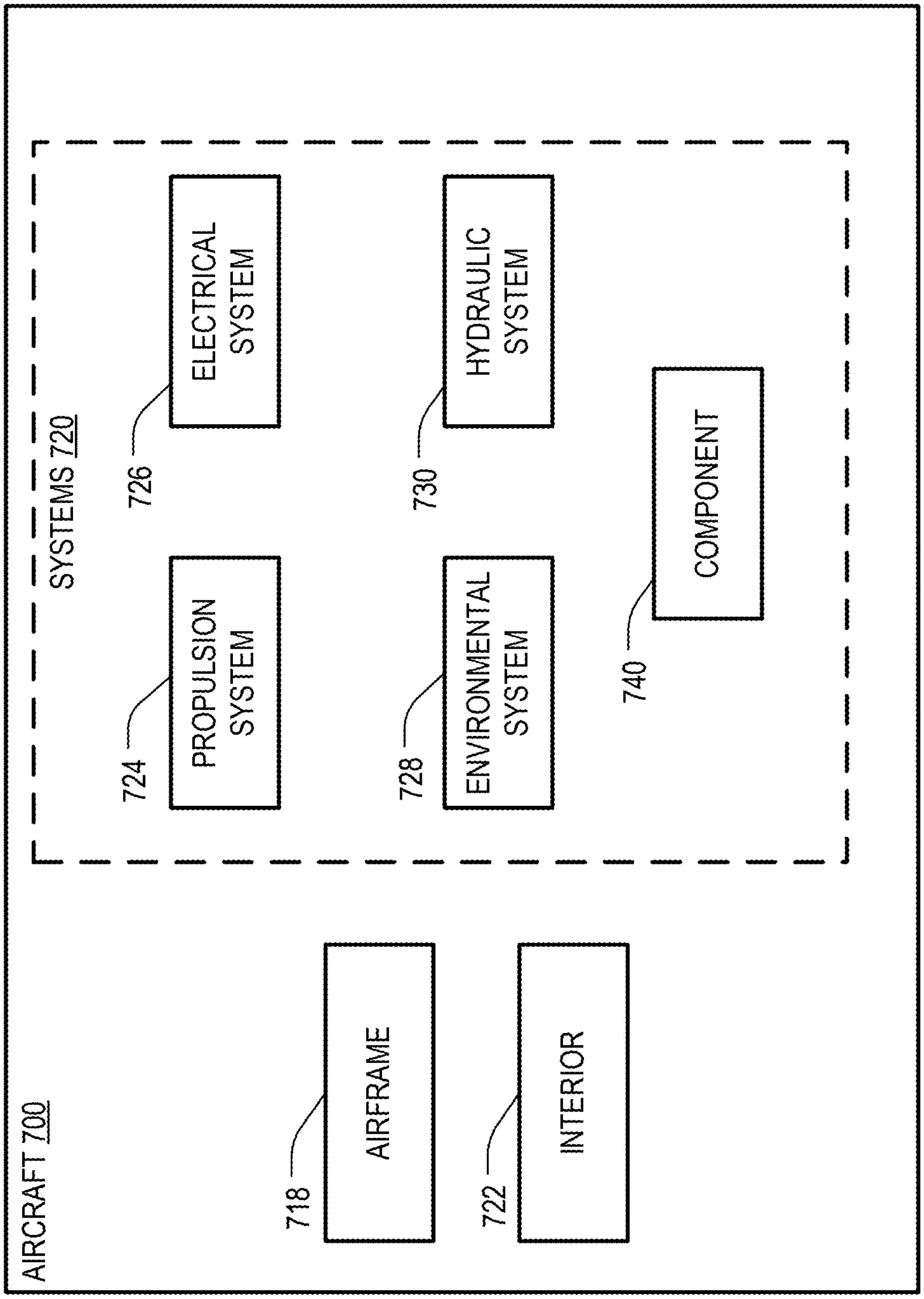
FIG. 7 illustrates an example aircraft that includes a component for detecting a speed of the aircraft, in accordance with some examples of the subject disclosure.

FIG. 7 illustrates an example aircraft 700 that includes a component 740 for estimating a speed of a vehicle, in accordance with some examples of the subject disclosure (e.g., using the method 400 of FIG. 4). In the example of FIG. 7, the aircraft 700 includes an airframe 718 with a plurality of systems 720 and an interior 722. Examples of the plurality of systems 720 include one or more of a propulsion system 724, an electrical system 726, an environmental system 728, and a hydraulic system 730. Any number of other systems may be included.

In the example of FIG. 7, the component 740 includes the sensor 102 of FIG. 1, the sensor 204 of FIG. 2, or a combination thereof. In some implementations, the component 740 is configured to perform certain operations, such as those described above with reference to the method 400 of FIG. 4.

To illustrate, in some examples, the component 740 is included in the airframe 718. In one example, the component 740 includes or corresponds to an exterior component of the aircraft 700, such as a skin portion of the aircraft 700. Alternatively or in addition, in other examples, the component 740 includes or corresponds to another component of the aircraft 700, such as component of the interior 722 that includes the sensor 102, the sensor 204, or a combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following examples:

According to Example 1, an aircraft includes an exterior skin and an emitter electrode disposed at a first position in proximity to the exterior skin and exposed to ambient air. The emitter electrode is configured to generate charged particles proximate the emitter electrode via a voltage pulse. The aircraft includes a collector electrode disposed at a second position in proximity to the exterior skin and exposed to ambient air. The second position is aft of the first position. The collector electrode is configured to detect a current associated with a flow of the charged particles during movement of the aircraft through an atmosphere. The aircraft includes one or more processors coupled to the emitter electrode and the collector electrode. The one or more processors are configured to measure a duration between the voltage pulse and the current. The duration is indicative of a speed of the aircraft.

Example 2 includes the aircraft of Example 1, wherein the voltage pulse comprises a pulse greater than five kilovolts.

Example 3 includes the aircraft of Example 1 or Example 2, wherein the voltage pulse has a duration of less than one microsecond.

Example 4 includes the aircraft of any of Examples 1 to 3, wherein the voltage pulse has a duration of approximately fifty nanoseconds.

Example 5 includes the aircraft of any of Examples 1 to 4, wherein the emitter electrode is shaped to define an apex to concentrate electrical field ionization.

Example 6 includes the aircraft of any of Examples 1 to 5, wherein the second position is approximately five centimeters aft of the first position.

Example 7 includes the aircraft of any of Examples 1 to 6, wherein the collector electrode has a blunted shape.

Example 8 includes the aircraft of any of Examples 1 to 7, wherein the first position comprises a position elevated from the exterior skin and extending above a boundary layer associated with the ambient air during movement of the aircraft through the atmosphere.

Example 9 includes the aircraft of any of Examples 1 to 8 and further includes a charge measuring circuit coupled to the collector electrode and the one or more processors.

Example 10 includes the aircraft of Example 9, wherein the charge measuring circuit is configured to sample the current at a sampling rate of greater than or equal to ten megahertz.

Example 11 includes the aircraft of any of Examples 1 to 10, wherein the collector electrode, the emitter electrode, or both comprise a plasma-durable material.

Example 12 includes the aircraft of Example 11, wherein the plasma-durable material comprises tungsten.

Example 13 includes the aircraft of any of Examples 1 to 12, wherein the collector electrode, the emitter electrode, or both comprise a dielectric material.

Example 14 includes the aircraft of Example 13, wherein the dielectric material comprises a ceramic material, a plastic material, a fiberglass material, or a combination thereof.

According to Example 15, a sensor includes an emitter electrode configured to be disposed at a first position and exposed to a fluid airflow. The emitter electrode is configured to generate charged particles proximate the emitter electrode via a voltage pulse. The sensor includes a collector electrode configured to be disposed at a second position and exposed to the fluid airflow. The second position is aft of the first position. The collector electrode is configured to detect a current associated with a flow of the charged particles during relative movement of the fluid airflow. The sensor includes one or more processors coupled to the emitter electrode and the collector electrode. The one or more processors are configured to measure a duration between the voltage pulse and the current. The duration is indicative of a speed of a vehicle.

Example 16 includes the sensor of Example 15, wherein an output of the collector electrode is indicative of an angular direction of the relative movement of the fluid airflow.

Example 17 includes the sensor of Example 15 or Example 16, wherein the collector electrode is one of an array of collector electrodes configured to be disposed at the second position and exposed to the fluid airflow. The array of collector electrodes includes a first set of collector electrodes angularly offset from the collector electrode in a first direction. The array of collector electrodes includes a second set of collector electrodes angularly offset from the collector electrode in a second direction. Outputs from the array of collector electrodes are indicative of an angular direction of the relative movement of the fluid airflow.

Example 18 includes the sensor of Example 17, wherein the collector electrode is aligned with the emitter electrode at a reference position.

Example 19 includes the sensor of Example 17 or Example 18, wherein the voltage pulse is of a first duration, and the emitter electrode is configured to generate charged particles proximate the emitter electrode via a second voltage pulse of a second duration. The second duration is longer than the first duration. The second voltage pulse is associated with the output of the collector electrode indicative of the angular direction of the relative movement of the fluid airflow.

According to Example 20, a method includes emitting charged particles via a voltage pulse at an emitter electrode disposed at a first position and exposed to ambient air. The method includes detecting a current at a collector electrode based on a flow of the charged particles. A duration between the voltage pulse and the current is indicative of a speed of an airflow. The collector electrode is disposed at a second position and exposed to ambient air. The second position is behind the first position relative to the airflow.

What is claimed is:

1. An aircraft comprising:

an exterior skin;

an emitter electrode disposed at a first position in proximity to the exterior skin and exposed to ambient air, wherein the emitter electrode is configured to generate charged particles proximate the emitter electrode via a voltage pulse;

a collector electrode disposed at a second position in proximity to the exterior skin and exposed to ambient air, wherein:

the second position is aft of the first position; and the collector electrode is configured to detect a current associated with a flow of the charged particles during movement of the aircraft through an atmosphere; and one or more processors coupled to the emitter electrode and the collector electrode, wherein the one or more processors are configured to measure a duration between a time of the voltage pulse and a time of the current, wherein the duration corresponds to a time-of-flight of the charged particles from the emitter electrode to the collector electrode, and wherein the duration is indicative of a speed of the aircraft.

2. The aircraft of claim 1, wherein the voltage pulse comprises a pulse greater than five kilovolts.

3. The aircraft of claim 1, wherein the voltage pulse has a duration of less than one microsecond.

4. The aircraft of claim 1, wherein the voltage pulse has a duration of approximately fifty nanoseconds.

5. The aircraft of claim 1, wherein the emitter electrode is shaped to define an apex to concentrate electrical field ionization.

6. The aircraft of claim 1, wherein the second position is approximately five centimeters aft of the first position.

7. The aircraft of claim 1, wherein the collector electrode has a blunted shape.

8. The aircraft of claim 1, wherein the first position comprises a position elevated from the exterior skin and extending above a boundary layer associated with the ambient air during movement of the aircraft through the atmosphere.

9. The aircraft of claim 1, further comprising a charge measuring circuit coupled to the collector electrode and the one or more processors.

10. The aircraft of claim 9, wherein the charge measuring circuit is configured to sample the current at a sampling rate of greater than or equal to ten megahertz.

11. The aircraft of claim 1, wherein the collector electrode, the emitter electrode, or both comprise a plasma-durable material.

12. The aircraft of claim 11, wherein the plasma-durable material comprises tungsten.

13. The aircraft of claim 1, wherein the collector electrode, the emitter electrode, or both comprise a dielectric material.

14. The aircraft of claim 13, wherein the dielectric material comprises a ceramic material, a plastic material, a fiberglass material, or a combination thereof.

15. A sensor comprising:

an emitter electrode configured to be disposed at a first position and exposed to a fluid airflow, wherein the emitter electrode is configured to generate charged particles proximate the emitter electrode via a voltage pulse;

a collector electrode configured to be disposed at a second position and exposed to the fluid airflow, wherein:

the second position is aft of the first position; and the collector electrode is configured to detect a current associated with a flow of the charged particles during relative movement of the fluid airflow; and one or more processors coupled to the emitter electrode and the collector electrode, wherein the one or more processors are configured to measure a duration between a time of the voltage pulse and a time of the current, wherein the duration corresponds to a time-of-flight of the charged particles from the emitter electrode to the collector electrode, and wherein the duration is indicative of a speed of a vehicle.

16. The sensor of claim 15, wherein an output of the collector electrode is indicative of an angular direction of the relative movement of the fluid airflow.

17. The sensor of claim 15, wherein the collector electrode is one of an array of collector electrodes configured to be disposed at the second position and exposed to the fluid airflow, and wherein:

the array of collector electrodes comprises:

a first set of collector electrodes angularly offset from the collector electrode in a first direction; and a second set of collector electrodes angularly offset from the collector electrode in a second direction; and wherein outputs from the array of collector electrodes are indicative of an angular direction of the relative movement of the fluid airflow.

18. The sensor of claim 17, wherein the collector electrode is aligned with the emitter electrode at a reference position.

19. The sensor of claim 17, wherein:

the voltage pulse is of a first duration; and the emitter electrode is configured to generate charged particles proximate the emitter electrode via a second voltage pulse of a second duration, wherein:

the second duration is longer than the first duration; and the second voltage pulse is associated with the output of the collector electrode indicative of the angular direction of the relative movement of the fluid airflow.

20. A method comprising:

emitting charged particles via a voltage pulse at an emitter electrode disposed at a first position and exposed to ambient air;

detecting a current at a collector electrode disposed at a second position and exposed to the ambient air, wherein the second position is behind the first position relative to an airflow, and wherein the current is based on a flow of the charged particles from the emitter electrode to the collector electrode; and, measuring, by one or more processors, a duration between a time of the voltage pulse and a time of the current, wherein the duration corresponds to a time-of-flight of the charged particles from the emitter electrode to the collector electrode, and wherein the duration is indicative of a speed of the airflow.

* * * * *